Sept. 19, 1967          E. K. MAXON          3,342,102
IMAGE PLANE POSITION APPRAISAL SYSTEM FOR A SLIDE PROJECTOR
Filed Feb. 23, 1965
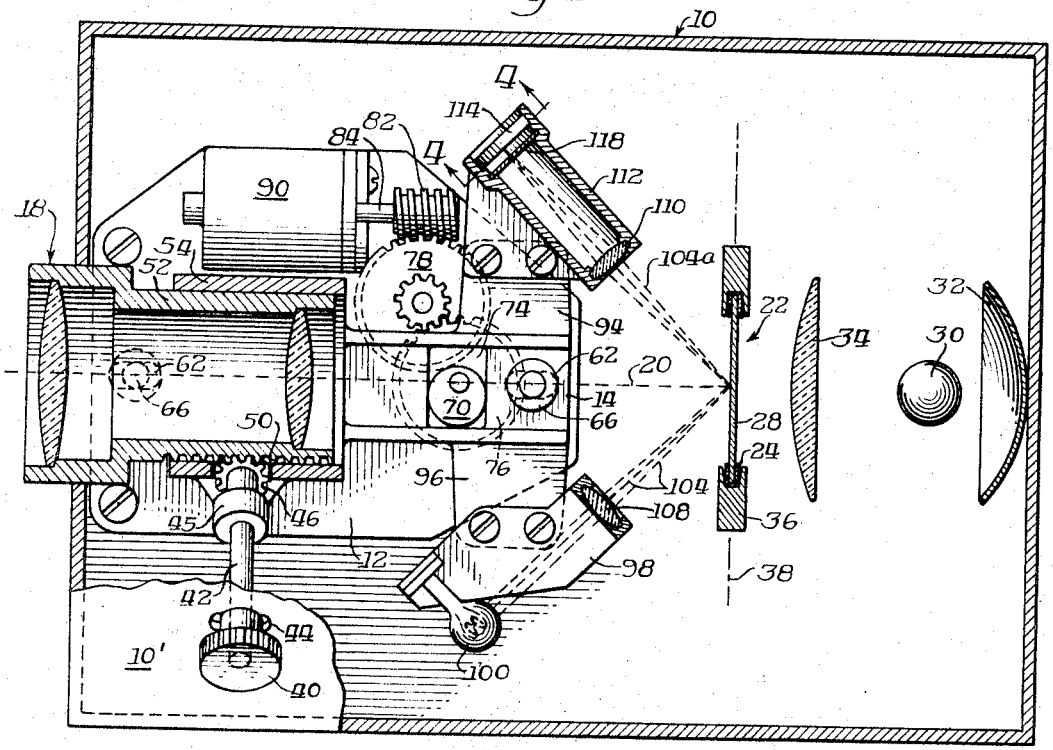
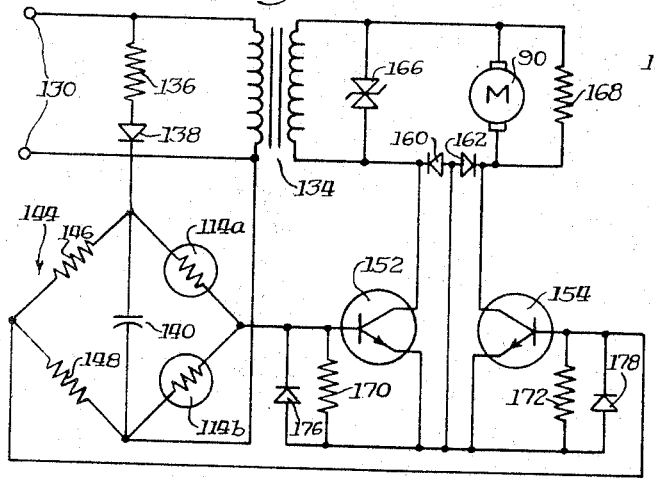
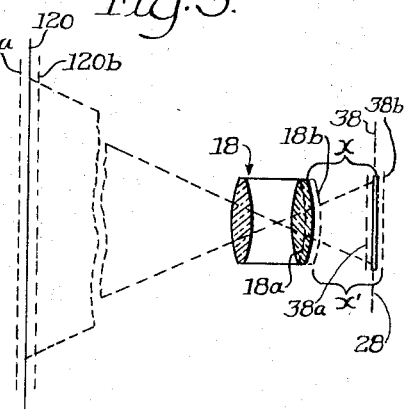
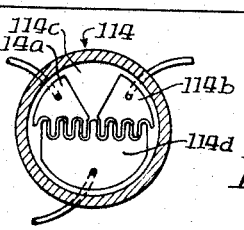
Inventor:
Eric K. Maxon
By Barry L. Clark
John E. Peele Jr.    Attys

United States Patent Office 3,342,102
Patented Sept. 19, 1967

3,342,102
IMAGE PLANE POSITION APPRAISAL SYSTEM FOR A SLIDE PROJECTOR
Eric K. Maxon, Evanston, Ill., assignor to Bell & Howell Company, Chicago, Ill., a corporation of Illinois
Filed Feb. 23, 1965, Ser. No. 434,254
2 Claims. (Cl. 88—26)

The present invention relates to a focus maintaining system for use with a projector, and particularly to such a system for causing movement of the projection lens relative to the image support material of a slide in order to maintain the focus of the resulting projected image critically sharp.

Some patents have suggested systems for maintaining the focus of projected images. These generally have appraised the slide position from outside the image area of that slide. Examples of the portion of the slide appraised are the exterior of the slide mount or the position of the image bearing material as interpreted by a probe extending through a hole in the mount. Because the image support material of most slides has some flexibility, the image area thereof is capable of movement relative to the non-image area or the portion held in the slide mount. Thus, most such devices and systems provide less than satisfactory performance. The majority of these devices have required the user to mount the slides either in special mounts or to maintain uniformity in the mount selected. In either case, the user is necessarily put to additional expense and trouble in changing each of his presently owned slides into these special and/or uniform mounts to obtain the desired results with the focus maintaining system of the particular projector. Another projector may not necessarily provide equivalent results with these same slides, thus limiting the use of the slides of one system to that particular system. Further, mounts of special fabrication, such as glass bound mounts, would likely require the user to manually focus a projector for each such slide. To overcome these and other faults, the present focus maintaining system has been devised. This system is capable of accepting all known types of mounts, including glass mounts with equally efficient performance.

Best focus of the projected image occurs when the image plane of the slide and the focal plane of the projection lens are coincident. The movement of the relatively large and unsupported (except for the edges as held by the mounts) image area of a slide in the axial direction causes the projected image to become defocused or blurred as the image plane moves from coincidence with the plane of focus of the lens. This image area may move because of variations in the slide materials, the effectiveness of the clamping of the mount to the edges of the material, the humidity of the atmosphere surrounding the projection and storage areas, and the length of time of projection. As I have implied, the movement of the image support material defining the image plane is generally independent of movement of the mount. Such movement, known as "popping" relates to the deforming of the support material and is generally considered to occur because of the rapid evaporation of surface moisture from the image support material caused by the heat generated by the projection lamp. The support material then generally either expands or becomes more taut in the mount causing a bowing of the material. The larger the unsupported image area, the more acute is the bowing. Further, the image area may first move in one direction and later, due to still further heating move through its initial image plane to the opposite side thereof. The total movement of the image area may approach 3/16 of an inch from one side of the initial image plane to the other. The center of the image area will be moved beyond the average 1/16 of an inch depth of focus of the typical projection lens such that the projected image becomes defocused. The image area adjacent the mount may remain in satisfactory, if not critical or best focus. Thus, it is desirable to maintain the focus of an image by reading the approximate center of the image area which will generally move the greatest amount. The instant system provides that this reading or appraisal of the image area occur without physical contact with the slide and that the reading be constantly translated to the lens during the entire time in which the slide is aligned with the projection axis to correct for shifting of the image area.

Various complex and relatively expensive systems incorporating electronic components have been devised to read the positions of the slide. Such systems have had varying degrees of ineffectiveness due to the overshoot or hunting by the servo-system. Although the movement of the projection lens is very slight, such hunting is generally considered undesirable and tiring to the eyes of those viewing the projected image. These and other systems have generally been relatively expensive and complex because of the required circuit components. The circuitry of the present invention is comparatively simple and is designed to cause the speed of the actuating motor drive to be reduced as the image approaches best focus, thus eliminating the tendency to overshoot with the resulting hunting.

An improved focal appraisal system for projectors and particularly slide projectors can be accomplished using a simple light beam servo positioning system without interfering with normal slide projector operation. Utilizing a dual photoconductor system and a small reversible DC motor for driving the projection lens carriage, a system has been developed which is simple in construction and alignment and economical in cost of manufacture. The simplicity is enhanced in that the components are capable of subassembly and prealignment followed by subsequent insertion of the subassembly into a projector accepting same. Once the alignment, for example of the sensing lamp and the dual photoconductor, is made, further alignment need not be resorted to because the several components are mounted for movement as a unit with no movement relative to one another.

To better understand this invention and the objects thereof, reference should be made to the accompanying drawings wherein:

FIG. 1 is a schematic view of the components forming the elements of the invention as applied to a slide projector;

FIG. 2 is a wiring diagram disclosing the circuitry applicable to the system as disclosed in FIG. 1;

FIG. 3 is a schematic disclosure of the principles enabling successful operation of the present invention; and FIG. 4 is a view taken along line 4—4 of FIG. 1 and disclosing details of the photoconductor.

Disclosed in FIG. 1 is a projector 10 having a base 12 on which a carriage 14 is supported for relatively free movement. On the carriage 14 is mounted a projection lens 18 defining a projection axis 20 along which an image from a slide 22 is projected. Slide 22, comprised of a mount 24 and an image support material or film 28 held therein, is supported in a slide carrier 36 of the projector. The area of the image support material 28 within the periphery of the mount and particularly the central portion thereof forms the hereinafter referred to as "image plane." Illumination of the image area is provided by a projection lamp 30. The light from the lamp is concentrated by a reflector 32 to pass through at least one condensing lens 34, such heat absorbing glasses as may be present (not shown), the slide 22 and the projection lens 18. The deformable image support material 28, which is capable of "popping," may bow either toward or away from condenser 34 when heated by lamp 30. The slide carrier 36 is desirably located so that it will be in the plane of focus 38 of the projection lens 18. This focal plane is inherently a predetermined distance behind the projection lens 18 when an image from a slide is critically focused upon a remote surface. The projected image is at best sharpness when the image plane is coincident with the focal plane.

Projection lens 18 is adjustably mounted on the carriage 14 in a manner such that it may be moved parallel to the projection axis relative to the carriage and be moved with the carriage. The movement relative to the carriage is accomplished by operation of a focusing member 40 which is attached to the end of a shaft 42. The shaft extends through an elongated slot 44 in housing 10' of the projector, and through a bearing 45 attached to the carriage 14 for movement therewith. The elongation of slot 44 permits the shaft to be moved therein as the carriage moves. A small gear 46 is fixed to the other end of the shaft 42 to mate with a rack 50 formed on the barrel 52 of lens 18. The barrel 52 is frictionally, although movably, retained in a caging 54 of carriage 14. The movement of the carriage relative to the base 12 may be maintained parallel with the projection axis through any of several known means. In this preferred embodiment, the alignment and extent of longitudinal movement of the carriage is limited by the length of a pair of elongated slots 62, 62 in the carriage. The length of these slots is slightly greater than the anticipated extent through which the image support material 28 will "pop." A pair of headed studs 66, 66 are attached to the base 12 and extend through the respective slots to also prevent undesired motion of the carriage relative to the base when the projector is being relocated.

Focusing member 40 is operated in a known manner to cause movement of the lens 18 relative to the carriage 14 to obtain an initial best focus of the projected image from a slide upon a remote surface. This movement of lens 18 establishes the predetermined relationship between the lens and the focal plane 38 such that the focal plane is made coincident with the image plane of slide 22.

Powered movement of the carriage 14 in a path parallel to the projection axis for purposes of maintaining the focus of the lens 18 supported thereon is accomplished by the rotation of an eccentric 70 which extends into an elongated recess 74, preferably in the bottom of the carriage. The eccentric is preferably integral with a gear 76 which is driven by an intermediate speed reducing gear or gears, such as that disclosed at 78. This latter gear is powered by a drive gear 82 which is fixed to the drive shaft 84 of a reversible DC motor 90. Motor 90 is fixed to the base 12. The direction of rotation of the motor is controlled by circuitry as will be hereinafter described. The drive of the motor 90 is transmitted to the carriage 14 as the eccentric 70 is caused to rotate about the axis of rotation of gear 76. Portions of the eccentric periphery will engage the forward and rearward wall portions of recess 74 to cause the carriage to be moved as guided by slots 62, 62 and studs 66, 66. The eccentricity of the eccentric 70 is sufficient to move the carriage in excess of the range through which the image support material 28 will "pop."

Extending from the carriage 14 are a pair of arms 94, 96, supporting components of an image plane position appraisal system. Each of these arms extends at an acute angle relative to the projection axis 20. Supported by plate 98, which may be mounted for adjustment on arm 96, is a sensing or appraisal lamp 100 producing a beam of light rays 104 relatively rich in infrared radiation. A condensing lens 108 is mounted on the plate 98 in the path of the light rays 104 to cause them to focus at a point approximately at the center of the slide image area 28. These rays are then reflected as rays 104a, through a second condensing lens 110 in one end of a baffle 112 attached to arm 94. The condensing lens 110 causes the light rays 104 to again come to a point of focus upon the surface of a light sensitive dual photoconductor cell 114 located at the opposite end of baffle 112. This cell 114, preferably of the cadmium selenide type, is formed with a unitary substrate supporting a layer of light sensitive conductive material, such as cadmium selenide. As seen in FIG. 4, this material is exposed at 114c and along a wavy path connected therewith. The material separates a dual pair of current conductor or electrode portions 114a and 114b to which electrical connections are made. The wavy path of material separates current conductor portions 114a 114b from a common electrode portion 114d. The material produces no effect, i.e., has no sensitivity, when light impinges on it but not on adjacent current conductor portions. However, as is understood in the art, such material has an electrical resistance characteristic which varies in inverse proportion to the quantity of light impinging thereon. That is, when no light strikes the material, its resistance is high and negligible current flows across the material between two electrodes or conductors; and when light impinges on the material, its resistance drops so that the material becomes a good conductor between electrodes, such as electrodes 114a or 114b, and the common electrode 114d. In the circuit as shown in FIG. 2, current will flow from one electrode 114a or 114b to common electrode 114d to form a complete circuit when a focused ray 104a impinges on the former and latter electrodes across the wavy path of material. However, the connections between electrodes 114a and 114b are made so that light impinging on these electrodes and the material therebetween only cannot establish a complete circuit. Thus, intermediate portion 114c effectively defines a "dead zone," selected with a width slightly in excess of the width of the focused ray 104a. A significantly wider zone would permit too much de-focusing before correcting, while a smaller zone would cause hunting as the circuitry attempts to locate the ray in the zone with equal or no fringing on the electrode portions. The dual photoconductor can be seen to have two light sensitive portions, each composed of a current conductor portion, the common electrde and the light sensitive material therebetween.

Before the cell 114 and in the path of the rays 104a which are reflected from the image support material 28 and pass through the baffle, is located a deep red filter 118 commonly described as an infrared filter. This filter is intended to pass substantially all of the infrared radiation in reflected rays 104a while passing a relatively small quantity of the visible radiation. The cell is highly sensitive in the infrared range of the spectrum, yet relatively non-sensitive in the visible range. Thus, the extraneous light, such as that from projection lamp 30 as diffused by the image support material, will have little, if any, effect upon the photoconductor 114. Normally the light of the projection lamp is relatively weak in infrared radiation due to filtering to reduce the heat impinging upon a slide being projected. It is noted that the aforementioned elements of the appraisal system are mounted on the carriage 14 for movement therewith.

Referring particularly to FIG. 3, in solid lines is seen an image plane 28 of a slide located coincident with the focal plane 38 of the lens 18. The image projected through the lens will fall upon a remote surface 120 such as a screen. Shifting of the image plane to a plane other than that coincident with the focal plane, such as occurs when the support material "pops," will cause the movement of the image plane to non-coincident planes such as 38a or 38b. The projected image will come to a focus in respective planes 120a or 120b if lens 18 is not moved to compensate therefor. Movement of the lens to its respective positions 18a or 18b will cause the focal plane to be shifted and to again produce a critically sharp projected image as the focal plane is returned to coincidence with the image plane. The distance $x$ between the lens and the focal plane is seen to be identical with the distance $x'$ as would occur, for example, when the image plane has shifted to plane 38b and the lens adjusted to compensate for the shifting.

More particularly, should the image plane shift forwardly to plane 38a, the projection lens 18 should be moved forwardly to maintain the spacing between the image plane and the focal plane coincident to provide the best possible projected image. It is thus seen that the focal plane 38 of the lens 18 remains this fixed distance $x$ behind the lens and it is necessary to shift either the remote surface 120, the lens 18, or the image plane 28 to obtain the desired critical focus of the projected image. It is readily understood that the movement of the remotely positioned screen would entail relatively complex machinery requiring a large drive means and would in many cases be impossible. It is desired that movement of the lens be used to compensate for movement of the slide. The slide is thus allowed to remain in the ideal location in the light cone as produced by the projection lamp 30 and concentrated by the reflector 32 and condenser lens 34. Movement of the slide 22 would necessarily require undesired adjustments of slide carrier 36. Further, the appraisal system may be prealigned in a non-adjustable manner.

The circuit as seen in FIG. 2 is designed to actuate motor 90 and thereby cause movement of lens 18 so as to move the focal plane relative to the image plane to keep them coincident for each movement of the image support material 28. The circuit includes a source 130 from which the current flows to a transformer 134. Current flowing through one side of the transformer is attenuated, rectified and filtered by the respective resistor 136, the diode 138 and the capacitor 140 to provide a D.C. voltage to serve as an excitation voltage for a bridge 144. Through the transformer, the bridge voltage current of the circuit is isolated from the control voltage current of the circuit.

The bridge 144 includes a pair of equal valued resistors 146, 148 and the respective portions 114a, 114b of photoconductor cell 114. Connected in circuit with the bridge are a pair of high gain type silicon transistors 152, 154. Such transistors operate as non-linear amplifier switching components and thus the current available from bridge 144 need not be further amplified. The control circuit portion includes a pair of blocking diodes 160, 162 which control the direction of current flow to motor 90. Thus, the motor is operated only when the current bypasses one of the diodes and flows through the transistor to which it is connected, which transistor has been activated by a photoconductor portion.

Other elements of the circuit include a suppressor diode 166 and a resistance 168 which together suppress transient voltages which may find their way into the circuit from conventional components (not shown), such as solenoids, other solid state components and other elements operatively connected to the transformer 134. Additionally, there are connected in each transistor branch of the circuit respectively a resistor 170, 172 and a diode 176, 178 to protect the transistors from potentially damaging reverse current flow.

When light, such as the rays 104a from the sensing lamp 100, impinges upon one of the cell portions, for example 114a, the resistance of that portion is reduced permitting current to flow therethrough and to turn "on" one of the pair of transistors, for example 152. The current now passes through the diode 176 to return to the bridge 144. The current flow through the control portion of the circuit is permitted as the current from the transformer 134 bypasses the blocking diode 162 to flow in one direction and to energize the motor 90 for rotation in one direction. Current is unable to flow through blocking diode 160 since transistor 154 is not turned "on."

Assuming the light rays 104a now impinge upon cell 114b, the transistor 154 is turned "on" and current flows therethrough bypassing blocking diode 160 to energize the motor 90 to cause rotation in the other direction.

The appraisal system is supported on movable carriage 14 with the angular relationship of the sensing lamp 100 and the photoconductor 114 in a desired orientation to cause the rays 104 to be reflected by the slide so as to be centered between current conductor portion 114a and 114b and to impinge upon the non-sensitive portion 114c of the photoconductor when proper focus has initially been obtained by adjustment of the lens with focusing member 40. When the reflected rays 104a impinge on either of the current conductor portions, no current flows through the circuit and the motor 90 is not energized. The system then interprets the relative positions of the slide and the lens as resulting in best focus of the projected image. This is the condition which the system will continuously seek.

When the slide "pops" inwardly of the projector (i.e. toward condenser 34 or to a plane, such as plane 38b as seen in FIG. 3), the reflected ray 104a is caused to move so as to impinge almost entirely upon cell portion 114b. The other cell portion 114a is not activated since very little stray light, if any, is impinging thereon. Thus, current flows through the system in a "positive" direction causing the motor 90 to be actuated to drive carriage 14, with the lens 18 thereon, rearwardly in a manner to align the focal plane and the image plane in the manner as described with respect to FIG. 3. This causes the focal planes to once again become coincident with the image plane. The circuit and motor 90 were energized as the support material "popped" and therefore the image plane began to move. Thus, the carriage 14 and projection lens 18 were almost instantaneously moved at substantially an identical rate with the image area 28 of the slide 22.

Should the slide "pop" outwardly of the projector (i.e. away from the condenser 34 or to plane 38a of FIG. 3), the reverse of the just described operations occur. Reflected rays 104a impinge upon cell portion 114a. Thus, the circuit is energized with power flowing through transistor 154. The motor rotates in the opposite direction causing the eccentric 70 to drive the carriage 14 thereby to move the lense 18 forward from the slide, while altering the position of ray 104a on cell 114. When the focal plane and the image plane are again coincident, the reflected ray 104a is impinging on the "dead zone" portion 114c between portions 114a and 114b of the photoconductor and no current flows.

As the bridge 144 approaches the new balance as a result of the shifting of the reflected ray 104a back to the non-sensitive portion 114c, the drive current of transistor 152 and thereby 90 is reduced. This reduction in current thereby causes the motor to slow down reducing the possibility of overshoot or hunting.

Although the operation of the system of the instant invention is believed to be understood, it will be described briefly. A sample slide is located in the slide carrier 36 of projector 10 and the projected image is caused to be focused upon a remote surface as lens 18 is adjusted relative to the carriage 14 by focusing means 40. This will cause the image plane of the slide to be positioned in the focal plane along projection axis 20. Light rays 104 from the sensing lamp 100 will impinge thereon and be reflected from the image area 28 of the slide to impinge upon the non-sensitive portion 114c of photoconductor 114. Thus, an initial best focused condition of the projected image has been established.

Other slides may now be moved by carrier 36 into the projection axis 20 to be viewed. Should one of the slides "pop," the image plane will move causing the reflected rays 104a to impinge upon other than the non-sensitive portion 114c of photoconductor 114. The respective portion of the bridge 144 will permit the flow of current through the control portion of the circuit causing energization of motor 90 for operation in a direction to cause movement of carriage 14 as is necessary to again return the reflected ray 104a to the non-sensitive portion of photoconductor 114. The extent of "popping" or image plane movement as related to the angular arrangement of the elements of the appraisal system is such that the reflected ray 104a or a fringe thereof is almost always maintained on one of the other of the cell portions when the slide is out of focus. Thus, the continuous seeking of the system to locate the light ray 104a on the non-sensitive portion of the photoconductor 114 continuously maintains best focus of the projected image.

Although a specific embodiment of the invention has been shown and described, it is to be understood that modifications and variations may be effected without departing from the scope of the novel concept of the invention.

I claim:

1. In a projector on which is mounted an image plane position appraisal system, said projector including a projection lens with a focal plane located a predetermined distance therebehind, said projector adapted to project series of slides, each of which comprises a film held along its edges in a mount defining an image area to be projected along the projection axis of said lens, and wherein the image area of the slide establishes an image plane capable of shifting out of coincidence with the focal plane of the projection lens upon "popping" of said film during projection, the projector including a base, a carriage mounted on said base for movement relative thereto, means for adjustably mounting said lens on said carriage for movement therewith, reversible driving means operably connected to move said carriage in a direction substantially parallel with said projection axis and relative to the image plane, and an appraisal system mounted on said carriage for movement therewith, comprising:

a source of light rays,
a balancing bridge circuit including a pair of resistors in series circuit with one another, and
a dual photoconductor having a pair of light sensitive portions connected in series circuit with one another, and an effectively non-sensitive portion between said light sensitive portions,
said light rays from said source being directed toward said image plane wherein said light rays are reflected from said image plane to impinge upon a portion of said dual photoconductor,
said bridge circuit generating an output current when said bridge is caused to be unbalanced in response to changes in resistance of one of said sensitive photoconductor portions due to said reflected light rays impinging on said portion, and
a sensing circuit including a pair of amplifier switching transistors in circuit connection with said bridge circuit and in circuit connection with an energizing circuit for said reversible driving means,
the energizing circuit energizing said reversible driving means when one of said transistor components of said sensing circuit responds to an output current of said bridge circuit upon unbalancing of said bridge circuit in one direction wherein said driving means moves said appraisal system as required until said light ray impinges upon said nonsensitive portion of said photoconductor,
said transistors operating such that the current through said transistor varies proportionally wherein said driving means is energized with similar proportionality, in response to variations in the illuminated condition of said light sensitive portion of said photoconductor,
whereby said reversible driving means is variably energized as said light ray approaches said non-sensitive portion of said photoconductor on which portion the light ray comes to rest thereby defining coincidence of said focal plane with said image plane.

2. An appraisal system as in claim 1, wherein said energizing circuit portion of said control circuit includes a power source and a pair of diodes normally blocking power flow through said control circuit; said diodes being selectively operable to control direction of power flow to said driving means wherein said driving means operates in one direction when one of said components is activated by said sensitive photoconductor portion to complete said circuit through said component such that said power flows in one direction bypassing one of said diodes and said power flows in the other direction when the other component is activated to close said circuit through said component wherein power flows in said other direction and bypasses said other diode such that said driving means operates in said other direction.

References Cited

UNITED STATES PATENTS

| | | |
|---|---|---|
| 2,999,436 | 9/1961 | Faulhaber. |
| 3,230,847 | 1/1966 | Gregory, et al. _____ 352—141 |
| 3,249,001 | 5/1966 | Stauffer _____ 352—140 |

NORTON ANSHER, Primary Examiner.

R. M. SHEER, Assistant Examiner.